United States Patent Office 3,770,813
Patented Nov. 6, 1973

3,770,813
PROCESS FOR PRODUCING GLYCOL ESTERS
John Kollar, Wyckoff, N.J., assignor to
Halcon International, Inc.
No Drawing. Continuation of abandoned application Ser. No. 738,856, June 21, 1968. This application Oct. 26, 1971, Ser. No. 192,665
The portion of the term of the patent subsequent to Sept. 5, 1989, has been disclaimed
Int. Cl. C07c 67/04, 69/16, 69/28
U.S. Cl. 260—497 R                17 Claims

ABSTRACT OF THE DISCLOSURE

This invention relates to a process for preparing glycol type esters by reacting an olefin with iodine, or an iodide and oxygen, in the presence of a carboxylate anion and a metal cation.

---

This is a continuation of application Ser. No. 738,856 filed June 21, 1968, now abandoned.

This invention relates to a process for preparing esters. More particularly this invention relates to a process for preparing glycol-like di-esters or multi-esters of carboxylic acids by the reaction of an olefin in the presence of the carboxylic acid.

It is an object of this invention to provide an improved process for the preparation of di-esters and multi-esters from olefins and carboxylic acids in high yields and selectivities. By multi-esters is meant compounds containing more than 2 ester moieties, per molecule. It is a further object to provide a continuous process for the preparation of these esters wherein a number of reactants are regenerable. Other objects and advantages will become apparent in the following specification.

In accordance with this invention, it has been found that di-esters and multi-esters (hereinafter called esters) may be readily obtained in high yield and selectivities by reacting an olefin, iodine (or a substance capable of liberating iodine and oxygen) and at least one metal cation, in the presence of a carboxylic acid anion.

Processes for preparing esters from olefins are known, but all suffer the drawback of low yield and/or low selectivities which make these processes uneconomical on a commercial scale. For example, in one procedure a mixture of ethylene, acetic acid, a halogen acid and an initiator is reacted to form ethylene glycol diacetate. This process has the long standing disadvantage of low conversion per pass and makes it unsuitable in a commercial scale operation.

In another process, a mixture of propylene, acetic acid and a mixed catalyst of a metal acetate and alkaline earth acetate is reacted to form a mixture of propylene glycol mono and di-acetate. This process suffers the disadvantage of low conversion and low selectivity, and for these reasons alone makes it unattractive on a commercial scale.

I have surprisingly found that an olefin can be conveniently reacted in the presence of iodine (or an iodine compound, oxygen and a suitable acid) and at least one metal cation to afford esters in both high yield and selectivity such that the process may be readily employed on a commercial scale. I have found that it is the unique combination of using at least one metal cation and $I_2$ or an iodine producing compound which affords us this surprising increase in yield and selectivity. I have further found that our process, unlike prior art processes can be successfully employed with a variety of olefins and acids.

In accordance with my invention, therefore, esters may be prepared from olefins by reacting a mixture of an olefin, iodine (or iodine producing compound and oxygen) in the presence of a carboxylic acid and at least one metal cation; alternatively an iodine producing compound may be reacted with oxygen in the presence of an acid, to form an iodine mixture which may then be reacted with an olefin in the presence of a carboxylic acid anion and at least one metal cation to form the desired ester. The acid used may be any organic or inorganic acid such as carboxylic acids, other organic acids such as toluene sulfonic acid or inorganic acids such as mineral acids (hydrochloric sulfuric acid and the like). If an acid other than a carboxylic acid is employed (these acids being preferred), no more than one equivalent of acid is used per equivalent of iodide. This alternative reaction procedure may be carried out in two or more reaction vessels as will be more fully described herein below.

In its more particular aspect, oxygen is employed whether the reaction starts with iodine or an iodine producing compound, in order to continuously regenerate iodine and thereby obtain a continuous process for preparing the desired esters. Accordingly, a distinct advantage of this invention is the substantially continuous re-use of the $I_2$, iodine compound and metal compound. It can thus be appreciated that in accordance with my invention, essentially the only reactants consumed are $O_2$, olefin and acid. Therefore, by employing the process of this invention, I have eliminated a prior art drawback of either discarding reactants or going through expensive isolation of those reactants which do not form part of the final product. In addition by using the unique combination of iodine or iodine compound and at least one metal cation, surprisingly high yields and selectivity are obtained. Below is a table of some reactions carried out in my laboratory which bring out these surprising results. The following reactions were carried out for 4 hours at 160° C. using 100 p.s.i.a. of $O_2$ and 200 p.s.i.a. of ethylene, with other reactants as indicated below:

| | Moles $I_2$ | Moles KI | Moles, metal Ac | Grams HAc | Percent ethylene diacetate | Percent selectivity |
|---|---|---|---|---|---|---|
| 1 | .001 | | | 10 | 0.6 | |
| 2 | .001 | | .0015 KOAc | 10 | 3.1 | |
| 3 | .001 | | .01 KOAc | 10 | 15.8 | 98 |
| 4 | | .002 | | 10 | 2.4 | |
| 5 | | .002 | .0026 Fe (OAc)$_2$ON | 10 | 8.0 | 94 |
| 6 | | .002 | .00106 Fe (OAc)$_2$ON | 10 | 16.8 | 93 |
| 7 | | .002 | .00082 Mn (OAc$_2$ 4 N$_2$O | 10 | 22.8 | 98 |
| 8 | | | .00082 Mn (OAc)$_2$ 4 N$_2$O | 10 | 0.0 | |
| 10 | .001 | | .01 pyridine | 10 | 31.2 | |

It becomes readily apparent that the combination of iodine and a metal cation or an iodine compound and a metal cation is essential in order to obtain satisfactory conversion of olefin to ester. Runs one, eight and nine clearly demonstrate that iodine or a metal cation alone are not operable. Therefore, it was surprising to find that a combination of $I_2$ and a non iodine producing metal compound each by itself being substantially inoperative in my reaction would in combination result in such significant increases in conversion to the desired ester.

It was even more surprising to find that particular combinations of metal compounds and iodine or iodine compound would lead to extremely high conversions and selectivities to the desired ester. This preferred aspect of the invention will be described more fully in the specification.

The rate of reaction can be greatly increased by varying the reaction conditions. For example, a two fold increase in rate may be obtained in any of the above examples by merely doubling the concentration of olefin starting material. Increased conversions may be also obtained by increasing the time of reaction or increasing the concentration of iodine, iodine compound or metal compound.

The reaction may suitably be carried out in one or more vessels. With ethylene and propylene it is preferred to carry out the reaction in one vessel. For example, a mixture of ethylene, oxygen or an oxygen containing gas, a carboxylic acid, iodine or an iodine producing compound and at least one metal cation is reached to form ethylene glycol di-carboxylate. With other olefins, it is preferred to carry out the reaction in two steps in two or more separate vessels. For example, in the first reaction vessel a mixture of a metal iodide, oxygen and a carboxylic acid are reacted to generate iodine. This reaction mixture is then cycled into a second reaction vessel wherein the olefin is reacted to yield the product ester. The additional metal compound may be added to the first or second reaction vessel or distributed in any ratio between both vessels. However, it is preferred that during start up all the metal compound be added to the first reaction vessel. The unreacted olefin and the water found during the reaction, may if desired, be removed from the reaction mixture, and preferably is removed. The product, if desired, may be partially or totally removed from the reaction mixture at any time during this continuous reaction. The remaining reaction mixture containing the metal cation and iodide is recycled into the first reaction vessel. The product, if desired, is isolated from the reaction mixture and the remaining reaction mixture recycled to the first reaction vessel. The mechanics of addition will vary depending upon the reaction conditions, reactants and desired product and can readily be adjusted to suit the particular reaction. Examples 1 to 10 infra illustrate the two vessel system as applied to propylene, butene-2, allyl alcohol, allyl acetate and methybutene-2. However it is to be understood that this system can be suitably applied to any other olefin of this invention.

As another aspect of this invention, it was found that this process may be carried out with a variety of olefins. Accordingly, olefins which may be alkenes, ar-alkenes and cycloalkenes. Included among the alkenes are mono alkenes, di-alkenes and tri-alkenes. The double bond in the mono alkene may be positioned at any one of the carbon atoms such as the alpha, beta, gamma and delta positions and the like. Suitably, these alkenes are straight or branch chain containing from 2 to 30 carbon atoms. Among the di-alkenes the double bond may be conjugated or isolated and the carbon chain may be straight or branched wherein the double bonds are located in any desired position and the olefin may contain up to 30 carbon atoms. The ar-alkenes contemplated by this invention contain an aromatic nucleus with an alkenyl side chain as described above. The cycloalkenes of this invention are compounds containing from 5 to 15 carbon atoms in the nucleus and at least one double bond.

More specifically, the alkenes may be: lower mono alkenes of from 2 to 5 carbons, intermediate alkenes of from 6 to 12 carbons or higher alkenes of from 13 to 30 carbons. Among the lower alkenes may be mentioned alkenes such as ethylene, 1-propene, allyl alcohol, 1-butene, 2-butene, methylbutene, 5-pentene and the like. Among the intermediate alkenes may be mentioned 3-heptene, 1-octene and 3-decene and among the higher alkenes, tetradecene-1, pentadecene-1, hexadecene-1, pentacosene-1 and triacontene-1. The lower di-alkenes may suitably contain up to 8 carbons, the intermediate alkenes 9 to 14 carbons and the higher alkenes 15 to 20 carbon atoms. Examples of these di-lower alkenes are 1,3-butadiene, 1,5-hexadiene, 1,4-pentadiene and 1,3-hexadiene.

More specifically, the ar-alkenes may be ar-lower alkenes such as phenyl alkenes and di-phenylalkenes wherein the alkenyl side chain may be any of those described above. Examples of such compounds are phenyl lower alkenes wherein the alkene side chain contains from 2 to 5 carbons such as styrene, 2-methyl styrene and alpha-ethyl-beta-methyl styrene and diphenyl alkenes such as 1,1-di-phenylethylene, 1,2-diphenyl propene and 2,3-di-phenyl-but-2-ene.

More specifically, the cycloalkenes may be from 5–12 carbon atoms such as cyclopentene, cyclopentadiene, cyclohexene, cyclodecene and cyclododecene.

All of the above alkenes, ar-alkenes and cycloalkenes may contain one or more functional substituents which are inert to the reaction such as nitro, cyano, chloro, lower alkoxy (methoxy, propoxy), lower alkylthio (methylthio, butylthio) hydroxy, lower alkanoyloxy of 2–6 carbons (acetyloxy) and the like.

In the more preferred aspects of this invention, the mono and di-lower alkenes, mono intermediate alkenes, mono higher alkenes, ar-lower alkenes and cycloalkenes are employed; and in its more preferred aspect ethylene, propylene, allyl alcohol, 1–3 butadiene, allyl acetate, allyl choride, butene-2, methylbutene-2, decene-1, styrene and cycohexene; but especially ethylene, are employed.

The olefins contemplated by this invention may contain the variety of impurities normally associated with commercially available olefins. In addition it is desirable to employ commercial olefins which contain inert materials normally associated with these olefins, such as propane in propylene, and ethane in ethylene. Furthermore, these inert materials may be employed in any desired ratio, and are preferably used in the various ratios as obtained from a variety of commercial sources.

The invention further contemplates the use of a variety of carboxylic acids. The carboxylic acids are preferably used as solvents and also used to form the acid moiety of the desired ester. Included among the acids are aliphatic acids, alicyclic mono carboxylic acids, heterocyclic acids and aromatic acids, both substituted and unsubstituted. For example, the invention contemplates the use of lower mono aliphatic acids of 1 to 4 carbon atoms such as: formic, acetic, propionic, butyric and isobutyric; intermediate mono aliphatic acids (of from 5 to 10 carbons) such as: valeric, isovaleric, caprioic, enanthic, caprylic, pelargonic and capric; higher mono aliphatic acids (of from 11–30 carbons) such as: lauric, myristic, palmitic, stearic, hexacosanoic and tricosanoic; di-aliphatic acids of from 2 to 6 carbons, such as: oxalic, malonic, succinic, glutaric and adipic. The invention further contemplates the use of substituted mono aliphatic acids containing one or more functional substituents such as lower alkoxy (methoxy, propoxy), chloro, cyano, lower alkylthio (methylthio, ethylthio, butylthio) and the like, examples of which may be cited as acetoacetic, chloroacetic, chloropropionic, cyanoacetic, methoxyacetic acid and 3-methylthiopropionic acid. Among the aromatic acids contemplated may be mentioned acids containing one or more carboxyl groups such as: benzoic, 1-naphthoic, 2-naphthoic, o-toluic, m-toluic, p-toluic, o-chlorobenzoic, m-chlorobenzoic, p-chlorobenzoic, o-nitrobenzoic, m-nitrobenzoic, p-nitrobenzoic, 3,5-dinitrobenzoic, salicyclic, m-hydroxybenzoic, p-hydroxybenzoic, anthranilic, m-aminobenzoic, p-aminobenzoic, phenylacetic, 2,4-dichlropheny-oxyacetic, hydrocinnamic, 2-phenylbutyric, 1-naphthaleneactic, and phthalic. The alicyclic mono carboxylic acids may contain from 3 to 6 carbons in the ring, both substituted and unsubstituted, and containing one or carboxyl groups such as: cyclopropanecarboxylic, cyclopentanecarboxylic and hexahydrobenzoic. The heterocyclic acids may contain from 1 to 3 fused rings both substituted and unsubstituted, containing one or more carboxyl groups and containing at least one and less than 4 hetero atoms such as oxygen, sulphur or nitrogen, examples of which may be cited as: picolinic, nicotinic, 3-indoleacetic, furoic, 2-thiophenecarboxylic, quinolinic, 2-methylindole-3-acidic, 3-chloro furoic, and 4-nitronicotinic.

In the more preferred aspects of this invention, the carboxylic acids is an aliphatic acid or aromatic acid, but especially the monophenyl aromatic acids and the lower aliphatic acids such as the lower unsubstituted and monoaliphatic acids or benzoic acid and most especially acetic acid.

This invention further contemplates the use of mixed carboxylic acids in any desired ratio, although it is preferred to employ the same acid as solvent and acid moiety of the subsequently desired ester. Also if desired, an inert solvent may be employed alone or with a carboxylic acid or mixtures thereof. If an inert solvent alone is used, it becomes necessary to have present in the reaction mixture a carboxylate anion corresponding to the acid moiety of the desired ester. The carboxylate anion may be obtained from any source, such as from a metal carboxylate. Inert solvents contemplated by this invention include any organic compound liquid at the reaction temperature which will not enter into the reaction, such as benzene, toluene, various ethers such as n-butylether, dioxane and the like. It is also within the contemplation of this invention that the final ester product as well as the olefins may be used as the solvent. However, as indicated previously, it is preferred to employ the carboxylic acid as solvent as well as the ester forming moiety. The carboxylic acid employed may suitably be any commercially available acid, such as aqueous acids. It is preferred however to employ commercial acids having no more than 15% water, and especially less than 5% water, such as 98% acetic acid. The acids used may suitably contain the various organic and inorganic impurities normally associated with the various commercial acids and for the purpose of this invention are contemplated in the invention and may remain as impurities or removed as one desires.

The metal compound (metal cation) employed in this invention may be a single salt or mixtures. For example, one may employ as the anion moiety of the sale any of the carboxylic groups of the above-mentioned carboxylic acids and as the cation moiety an alkali metal, any of the heavy metals of atomic number 21–30 and 48, such as vanadium, chromium, copper, manganese, iron, cobalt or nickel, or compounds containing nitrogen in the cation moiety, such as tri lower alkyl aniline (9–13 carbons such as trimethylamine, triethylamine) ammonium acetate, or organo nitrogen compound such as piperidine, pyridine, and the like. Any variety of nitrogen compounds may be used as long as these compounds are considered bases. The above mentioned types are used solely as examples of the basic nitrogen compounds operable in this invention. These nitrogen containing compounds are hereinafter referred to as nitrogen cations. If desired, the metal compound may be added in any form which in solution will yield at least some metal ions. For example, the metal compound to be added may be the metal carbonate, oxide, hydroxide, iodide, lower alkoxide (methoxide), phenoxide, sulfide, cyanide or metal carboxylate wherein the carboxylate ion is the same or different from the solvent anion. If it is desired to employ one metal cation and an iodide in the process of this invention, one may employ any of the above metals in the form of its iodide. Similarly one may employ iodine and any one of the metal compounds indicated. In its preferred aspect, the metal compound is adedded as its oxide, hydroxide or salt of the acid solvent. In the most preferred aspects of this invention, the carboxylic acid salt of the metal compound contains the anion of an aromatic acid or aliphatic acid, particularly the anion of the unsubstituted mono-lower aliphatic acids such as acetic acid, propionic acid and butanoic acid or benzoic acid, but especially acetic acid. The most preferred cation of these acid salts are the alkali metals (especially potassium), manganese, vanadium, copper, cobalt, cromium or iron, but especially manganese. Accordingly, in the most preferred aspect of this invention, the metal compound is, vanadium acetate, manganese acetate, iron acetate, potassium acetate and especially manganese acetate. The metal compound empolyed may desirably contain impurities normally associated with the commercially available metal compounds, and need not be purified any further. In the preferred aspect of this invention the commercially available compound is employed.

When it is desired to use an iodine producing compound on the initial phase of the reacting instead of iodine itself, one may employ any compound capable upon oxidation or by other means, of producing iodine in solution. For example one may use the alkali iodides, the metal iodides containing metals of atomic number of 21–30 and 48, alkali triodides, lower aliphatic iodides (propyliodide, pentyliodide), cyclo lower aliphatic iodides (cyclohexyliodide) or lower aliphatic diodides, all of which are considered for nomenclature purposes to be compounds containing iodide anions. The invention also contemplates the use of a mixture of two or more iodine producing compounds, as well as mixtures wherein the cation of the iodide compound may be the same or different from the cation of the other metal compound employed. In the most preferred aspects of this invention, the reaction is carried out in the presence of iodine, or alkali metal iodide. The iodide compounds or iodine employed may suitably contain impurities therein, normally associated with commercially available iodine or the iodides, and in the preferred aspect of this invention the commercially available materials are employed.

Accordingly, in the preferred aspect of this invention: the olefin is a mono lower aliphatic olefin, di lower aliphatic olefin, a chloro, hydroxy or lower alkanoyloxy substituted mono lower aliphatic olefin, intermediate aliphatic olefin or an aromic olefin; especially ethylene, propylene, allyl alcohol, 1,3-butadiene, allyl acetate, allyl chloride, butene-2, methylbutene-2, decene-1 and styrene; the carboxylic acid solvent is a lower mono aliphatic acid, especially acetic acid; the iodine, is in the form of molecular iodine or an alkali metal iodide (i.e., KI); and the metal compound is the manganese, iron, copper, cobalt, cromium or vanadium salt of a mono lower aliphatic acid, especially of acetic acid.

The various reactants may be employed over a wide range of concentration and as indicated previously variations in concentration will only be one factor in the eventual yield of product obtained. Accordingly, the concentration of iodide or iodine expressed in weight percent of iodine to total solution, may be from 0.01% $I_2$ to 20% $I_2$ or higher, but preferably 0.05% $I_2$ to 10% $I_2$ and especially 0.1% $I_2$ to 5% iodine. The concentration of total cation present expressed in terms of equivalents of cation/equivalents of iodide may suitably vary from 40:1 to .5:1 but preferably 15:1 to 1:1 and especially 10:1 to 1.1:1.

The reaction mixture may contain mixed metals, such as two heavy metals selected from atomic number 21–30 and 48. However, in the most preferred aspect of this invention one alkali and one heavy metal is employed. The ratio of alkali metal to heavy metal expressed in terms of equivalents may be from .5:1 to 20:1 but preferably from 2:1 to 10:1. For example, employing the preferred heavy metal manganese, iron or vanadium and the preferred alkali metal potassium a ratio of less than 2:1 to 5:1 potassium to heavy metal is employed, and especially 2:1 to 3:1.

The concentration of the olefin in the reaction mixture may be from as low as .1 wt. percent to as high as 50 wt. percent or more although it preferred to utilize from 5 to 25 wt. percent of the olefin. The exact concentration chosen is dependent upon a number of factors such as the reactivity of the olefin and the economic balance of recycling unreacted olefin versus reaction rate. Generally it has been found that doubling the concentration of olefin increases the rate of production of product by a factor or two. Additionally it has been found that more branched olefins are more reactive than less branched olefins when used in the same molar concentrations.

With ethylene, I have successfully operated at 25 p.s.i.a. of ethylene although I prefer to operate at 200 p.s.i.a. to 1000 p.s.i.a. ethylene or more. As with olefins that are liquid under operating conditions, I find that an increase in ethylene pressure gives a proportioned increase in rate of productivity of ethylene glycol diacetate.

The temperature of reaction may vary from 90° to the boiling point of the solvent within the reaction zone, but preferably the temperature is between 110° and 220° C., and especially between 130° and 180° C.

The time of reaction will depend to a great extent upon the concentration of reactants, and therefore, may suitably be between 1 minute and one or more days. However, under the more preferred conditions, the reaction time may be from 10 minutes to 4 hours.

The esters prepared from the alkene, ar-alkene and cycloalkene starting materials of this invention find ready use as solvents and plasticizers. The glycol derivatives of the product higher alkyl esters are also used extensively in the detergent industry. The free glycols of the aralkyl esters produced in the invention are extensively employed in the perfume and pharmaceutical industries. The cycloalkane esters are also used as intermediates in the production of various polymers. Other and more specific uses are shown in the examples.

RUNS 1–25

To a mixture of 100 p.s.i.a. of oxygen and 200 p.s.i.a. of ethylene is added the materials as indicated below, Runs 1–25, and the reaction mixture heated at 160° C. for 4 hours, in a glass lined reactor with shaking. The percent of product ethylene diacetate obtained is indicated in the table below:

| Run | G. | Moles | G. | Moles | | AcOH, g. | Ut. percent prod. in effluent |
|---|---|---|---|---|---|---|---|
| 1 | .25 | .001 I$_2$ | | | | 10 | .6 |
| 2 | .25 | .001 I$_2$ | .025 | .00025 | KOAc | 10 | .42 |
| 3 | .25 | .001 I$_2$ | .05 | .0005 | KOAc | 10 | 1.2 |
| 4 | .25 | .001 I$_2$ | .098 | .001 | KOAc | 10 | 1.4 |
| 5 | .25 | .001 I$_2$ | .156 | .0015 | KOAc | 10 | 3.1 |
| 6 | .25 | .001 I$_2$ | .48 | .005 | KOAc | 10 | 8.8 |
| 7 | .25 | .001 I$_2$ | .98 | .01 | KOAc | 10 | 15.8 |
| 8 | | | | .00082 | MnOAc | 10 | 0 |
| 9 | .33 | .002 KI | | | | 10 | 2.4 |
| 10 | .33 | .002 KI | .05 | .00026 | Fe acetate | 10 | 8.0 |
| 11 | .33 | .002 KI | .1 | .00053 | do | 10 | 13.2 |
| 12 | .33 | .002 KI | .2 | .00106 | do | 10 | 16.8 |
| 13 | .33 | .002 KI | .4 | .00212 | do | 10 | 4.8 |
| 14 | .33 | .002 KI | .2 | | Ni acetate | 10 | 1.6 |
| 15 | .33 | .002 KI | .2 | | Cr acetate | 10 | 3.2 |
| 16 | .33 | .002 KI | .2 | | Cu acetate | 10 | 5.0 |
| 17 | .33 | .002 KI | .2 | | Co acetate | 10 | 5.9 |
| 18 | .33 | .002 KI | .2 | .00082 | Mn acetate | 10 | 22.8 |
| 19 | .33 | .002 KI | .2 | | Zn acetate | 10 | 5.0 |
| 20 | .33 | .002 KI | .2 | | Cd acetate | ¹10 | 4.4 |
| 21 | .33 | .002 KI | | | | 10.98 | 12.0 |
| 22 | .33 | .002 KI | .1 | .00053 | Fe acetate | 10.98 | 22.8 |
| 23 | .33 | .002 KI | .2 | .00106 | do | 10.98 | 25.4 |
| 24 | .33 | .002 KI | .4 | .00212 | do | 10.98 | 18.6 |
| 25 | .33 | .002 KI | .2 | Ni (OAc)$_2$ | | 10.98 | 5.8 |

¹ KOAc.

Example 1

Into a stirred vessel (Reactor 1) is added a solution of 250 g. KI, 147 g. KOAc and 1050 acetic acid. This reaction mixture is reacted with O$_2$ at a pressure of 75 p.s.i.g. at 140° C. for 1 hour. The liquid effluent from Reactor I is then pumped to a stirred vessel Reactor II along with 200 g. of propylene and is maintained therein for 2 hours at 140° C. at ambient pressure. The effluent from Reactor II is fractionated to remove unreacted propylene then recycled to Reactor I at the above conditions then to Reactor II along with 200 g. of propylene. This sequence is repeated thru 6 cycles; after each cycle a small sample is taken and analyzed by gas liquid chromatography for propylene glycol diacetate and propylene glycol monoacetate. The results are listed below:

| Cycle: | Percent propylene glycol diacetate | Percent propylene glycol monoacetate |
|---|---|---|
| 1 | 5.7 | Trace |
| 2 | 10.6 | .4 |
| 3 | 15.0 | .8 |
| 4 | 19.1 | 1.3 |
| 5 | 22.7 | 2.0 |
| 6 | 25.9 | 2.8 |

After the sixth cycle the effluent is distilled with 300 g. of biphenyl as distillation product chaser. 400 g. of propylene glycol diacetate is recovered. Essentially no monoacetate is recovered since esterification takes place during the distillation as the water is removed. A molar selectivity of 97 M. is realized based on the propylene consumed.

The product diacetate can be hydrolyized (by any well known means) to yield the commercially desirable propylene glycol.

Similarly, when an equivalent amount of manganese acetate is used in place of potassium acetate in the above example, similar results are obtained.

Example 2

Allyl acetate is reacted in a two reactor system as in Example 1 wherein 125 g. of KI, 73 g. KOAc and 1050 g. of acetic acid is charged to Reactor I and subjected to 75 p.s.i.a. O$_2$ for 1 hour at 140° C. After the reaction in Reactor I the liquid effluent is cycled to Reactor II along with 100 g. of allyl acetate and reacted for 2 hours at 140° C. The effluent from Reactor II is partially fractionated to remove allyl acetate and most of the formed water. This sequence is repeated through 18 cycles and yields a product mix after fractionating of allyl acetate and water which contain 46.9% triacetin by gas liquid chromatography. This value represent 9.85 M of product per mole of I$_2$ (calculated) charged. A selectivity of 96 M percent is realized based on converted allyl acetate.

Triacetin can be hydrolyzed (by any well known means) to yield the commercially valuable glycerol.

Similarly, when an equivalent amount of ferrous iodide, manganese iodide triethylamine iodide or vanadium iodide is used in place of potassium iodide in the above example, similar results are obtained.

Similarly, when an equivalent amount of manganese iodide and manganese acetate propyliodide and manganese acetate, ethylene diodide and manganese acetate or manganese iodide and vanadium acetate are used in place of potassium iodide and potassium acetate, similar results are obtained.

Similarly, when an equivalent amount of pyridine acetate, piperidine acetate, ammonium acetate, trimethylamine, manganese benzoate, potassium nicotinoate, potassium oxalate or potassium cyclopentane carboxylate is employed in place of potassium acetate, similar results are obtained, as to the glycol derivatives obtained, when the product ester is hydrolyzed.

Example 3

Allyl alcohol is reacted as in Example 2 for three cycles and found to yield triacetin. However the allyl alcohol is esterified to allyl acetate and after removal from Reactor II is fractionated as allyl acetate and water. For the second and third cycle to Reactor II the recovered allyl acetate with only makeup allyl alcohol is added.

Example 4

Butene-2 is reacted as in Example 2 for 4 cycles and found to yield 2,3 butane diacetate. The 2,3 diacetate of butane is a useful intermediate for cracking to the commercially desirable butadiene.

Similarly, when an equivalent amount of propionic acid, pentanoic acid, n-undecyclic acid (reaction temperature maintained at 200° C.), succinic acid (reaction temperature maintained at 195° C.), cyclohexane carboxylic acid or picoltoic acid is used in place of acetic acid in the above example there is obtained 2,3-butene glycol dipropionate, di-pentanoate, di-n-undecylate, succinate, di-cyclohexyl carboxylate or di-picolinate respectively.

Similarly, when an equivalent amount of 2-propene-1-methylthio, tetradecene or decene-1, is used in place of butene-2 in the above example there is obtained the respective propylene glycol diacetates.

Example 5

2 methyl butene-2 is reacted in a two reactor system as in Example 1 wherein 31 g. of KI, 18 KOAc and 1050 g. of acetic is charged to Reactor I and subjected to 50 p.s.i.a. $O_2$ for 15 minutes at 130° C. After the reaction in Reactor I the liquid effluent is pumped to Reactor II along with 25 g. of 2 methyl butene-2 and reacted for 15 minutes at 130° C. The effluent from Reactor II is fractionated to remove unreacted 2 methyl butene-2 and some of the formed water. This sequence is repeated through 40 cycles and yields a product mix after fractionating of 2 methyl butene-2 and water which contains 52.1% 2-methyl butene 2,3 diacetate. A selectivity of 97 M percent of product is realized based on reacted 2-methyl butene-2. The product 2-methyl butane 2,3 diacetate is a useful intermediate for cracking to the commercially desirable isoprene.

Example 6

Cyclohexene is reacted as in Example 2 with 120 g. NaI 20 g. sodium hydroxide and 1050 g. of β Chloropropionic and through 4 cycles. Cyclohexane 1,2 di β chloropropionate is formed.

Example 7

1,5 hexadiene is reacted as in Example 2, through 3 cycles. 5-hexene 1,2 diacetate and some hexane 1,2,5,6 tetraacetate is formed.

Example 8

Styrene is reacted as in Example 2 with 75 g. of CsI, 25 g. of $Cs_2CO_3$ and 1050 g. of acetic acid through 4 cycles. Ethyl benzene 2, β-diacetate is formed.

Similarly, when o-nitrostyrene or p-methoxystyrene is used in place of styrene in the above example there is obtained the corresponding nitro or methoxy compound.

Example 9

Propylene is reacted as in Example 2 with 25 g. of $RbI_2$, 10 g. $Rb_2O$ and 300 g. of o-methoxy benzoic acid. Only 40 g. of propylene is charged into Reactor II. Propane 1,2- di-o-methoxy benzoate is formed.

Example 10

Allyl acetate is reacted in a two reactor system as in Example 2 but started in Reactor II with 95.5 g. $I_2$, 147 g. KOAc, 1050 g. acetic acid and 100 g. of allyl acetate. The effluent is treated as in Example 2 and put through 15 additional complete cycles. Essentially the same level of triacetate, 47.1% of the final product is obtained in essentially the same selectivity 96 M percent.

The previous examples, 1 to 10 demonstrate the exceptional results obtained with a reycle technique. Although in each of these examples the reaction product is continuously recycled, the reaction could be carried out if desired by removing part or all of the product at any time during the continuous reaction. Similarly, part or all of the unreacted starting olefin may be allowed to remain in the reaction system before each recycle. In addition, if it is desired, dissolved oxygen in Reactor I may be partially or totally removed prior to recycle of the reaction mixture to Reactor II. However, in the preferred reaction, the unreacted starting material is removed prior to recycle, the reaction product is continuously recycled through the system until the desired number of recycles are obtained and the dissolved oxygen is allowed to remain in the reaction system.

I claim:

1. A process for preparing an ester which comprises intimately contacting, in the liquid phase, an olefin selected from the group consisting of lower mono alkenes of 2–5 carbon atoms and such lower mono alkenes having a chloro, hydroxy or lower alkanoyloxy substituent with a monobasic aliphatic carboxylic acid of 1–4 carbon atoms, iodine or an iodide anion, oxygen and at least one cation selected from the group consisting of alkali metal cations, a heavy metal cation of atomic number 21–30 and 48 and nitrogen-containing cations derived from tri-lower alkyl amines, ammonia, piperidine or pyridine, at elevated temperatures, to form the desired ester.

2. A process for preparing an ester which comprises intimately contacting, in the liquid phase, an olefin selected from the group consisting of lower mono alkenes of 2–5 carbon atoms and such lower mono alkenes having a chloro, hydroxy or lower alkanoyloxy substituent, iodine, a mono-basic aliphatic carboxylic acid of 1–4 carbon atoms and at least one cation selected from the group consisting of alkali metal cations, a heavy metal cation of atomic number 21–30 and 48, and nitrogen-containing cations derived from tri-lower alkyl amines, ammonia, piperidine or pyridine at elevated temperatures, to form the desired ester.

3. A process for preparing an ester which comprises in combination: (a) intimately contacting, in the liquid phase, an iodide anion with oxygen in the presence of a mono-basic aliphatic carboxylic acid of 1–4 carbon atoms at elevated temperatures, to form an iodine mixture; and (b) intimately contacting, in the liquid phase, said iodine mixture with an olefin selected from the group consisting of lower mono alkenes of 2–5 carbon atoms and such lower mono alkenes having a chloro, hydroxy or lower alkanoyloxy substituent at elevated temperatures, in the presence of a mono-basic aliphatic carboxylic acid of 1–4 carbon atoms and at least one cation selected from the group consisting of alkali metal cations, a heavy metal of atomic number 21–30 and 48, and nitrogen-containing cations derived from tri-lower alkyl amines, ammonia, piperidine or pyridine to form the desired ester.

4. A process for preparing an ester which comprises in combination: (a) intimately contacting, in the liquid phase, an iodide anion with oxygen in the presence of a mono-basic aliphatic carboxylic acid of 1–4 carbon atoms at elevated temperatures, and in the presence of at least one substance selected from the group consisting of alkali metal cation, heavy metal cation of atomic number 21–30 and 48 and nitrogen-containing cations derived from tri-lower alkyl amines, ammonia, piperidine or pyridine; to form an iodine mixture and (b) intimately contacting, in the liquid phase, said iodine mixture with an olefin selected from the group consisting of lower mono alkenes of 2–5 carbon atoms and such lower mono alkenes having a chloro, hydroxy or lower alkanoyloxy substituent at elevated temperatures, in the presence of a mono-basic aliphatic carboxylic acid of 1–4 carbon atoms and at least one cation selected from the group consisting of alkali metal cations, a heavy metal of atomic number 21–30 and 48 and nitrogen-containing cations derived from tri-lower alkyl amines, ammonia, piperidine or pyridine, to form the desired ester.

5. A continuous process for preparing an ester which comprises in combination; (a) in a first reaction vessel, intimately contacting, in the liquid phase, an iodide anion with oxygen at elevated temperatures, in the presence of a mono-basic aliphatic carboxylic acid of 1–4 carbon atoms to form an iodine mixture; (b) continuously passing said iodine mixture to a second reaction vessel, intimately contacting, in the liquid phase said iodine mixture with an olefin selected from the group consisting of lower mono alkenes of 2–5 carbon atoms and such lower mono alkenes having a chloro, hydroxy or lower alkanoyloxy substituent at elevated temperatures, in the presence of a mono-basic aliphatic carboxylic acid of 1–4 carbon atoms and at least one cation selected from the group consisting of alkali metal cation, a heavy metal cation of atomic number 21–30 and 48 and nitrogen-containing cations derived from tri-lower alkyl amines, ammonia, piperidine or pyridine, to form a product mixture containing the desired ester and iodide anion; and (c) continuously removing at least a portion of said product mixture from said second reaction vessel, recovering product ester therefrom and continuously recycling at least a portion of said iodide anion to said first reaction vessel.

6. The process of claim 3 wherein in step (a) the iodide is part of an iodide compound selected from the group consisting of alkali metal iodide and tri-iodide, a heavy metal of atomic number 21–30 and 48 iodide, and a lower aliphatic di-iodide.

7. The process of claim 4 wherein the iodine anion of step (a) is selected from the group consisting of alkali metal iodide and tri-iodide, a heavy metal of atomic number 21–30 and 48 iodide and a lower aliphatic di-iodide.

8. The process of claim 1 wherein the reaction is carried out in the presence of an alkali metal iodide; a solvent selected from the group consisting of a lower aliphatic acid, and with at least one heavy metal cation; the ratio of total metal to iodide expressed in terms of equivalents of metal to equivalents of iodide is from 40:1 to 0.5:1, and the ratio of alkali metal to heavy metal is from 2.0:1 to 10:1.

9. The process of claim 2 wherein the reaction is carried out in the presence of a lower mono aliphatic acid solvent; the ratio of total metal to iodide expressed in terms of equivalents of metal to equivalents of iodide is from 40:1 to 0.5:1.

10. The process of claim 6 wherein the iodide anion of step (a) is part of an alkali metal iodide; the reaction of steps (a) and (b) are carried out in the presence of a lower mono aliphatic acid solvent, and in step (b) the presence of a heavy metal; the ratio of total metal to iodide expressed in terms of equivalents of metal to equivalents of iodide is from 40:1 to 0.5:1, and the ratio of alkali metal to heavy metal is from 2.0:1 to 10:1.

11. The process of claim 7 wherein the reaction in steps (a) and (b) is carried out in the presence of a lower mono aliphatic acid solvent, and in the presence of a heavy metal in step (b); the ratio of total metal to iodide expressed in terms of equivalents of metal to equivalents of iodine is from 40:1 to 0:51 and the ratio of alkali metal to heavy metal is from 2.0:1 to 10:1.

12. A process for preparing an ester which comprises in combination; in the liquid phase, (a) intimately contacting potassium iodide in acetic acid with oxygen at temperatures above 90° C. in the presence of a heavy metal compound selected from the group consisting of manganese acetate, ferric acetate and vanadium acetate, to form an iodine mixture; and (b) intimately contacting said iodine mixture, at temperatures above 90° C. with a compound selected from the group consisting of ethylene, propylene, 1,3-butadiene, styrene and allyl alcohol; the ratio of total metal to iodide expressed in terms of equivalent of metal to equivalents of iodine is from 10:1 to 1.1:1 and the ratio of potassium to heavy metal expressed in equivalents is from 2.0:1 to 10:1; to form the desired ester.

13. A process for preparing ethylene glycol diacetate which comprises intimately contacting, in the liquid phase, ethylene, oxygen, potassium iodide and maganese acetate, in acetic acid at a temperature of 120 to 190° C. wherein the ratio of total metal to iodide expressed in equivalents is from 10:1 to 1.1:1 and the ratio of potassium to manganese expressed in equivalents is 2:1 to 10:1 to form the desired ethylene glycol diacetate.

14. A process for preparing propylene glycol diacetate which comprises in combination, in the liquid phase, (a) intimately contacting potassium iodide, oxygen and manganese acetate, in acetic acid at a temperature of 120–190° C. to form an iodine mixture; and (b) intimately contacting said iodine mixture with propylene at a temperature of 120–190° C., wherein the ratio of total metal to iodide expressed in equivalents is from 10:1 to 1.1:1, and the ratio of potassium to manganese expressed in equivalents is 2.0:1 to 10:1, to form the desired propylene glycol diacetate.

15. A process for preparing butene glycol tetra-acetate which comprises in combination, in the liquid phase, (a) intimately contacting potassium iodide, oxygen and manganese acetate, in acetic acid at a temperature of 120–190 C. to form an iodine mixture; and (b) intimately contacting said iodine mixture with 1,3-butadiene at a temperature of 120–190° C., wherein the ratio of total metal to iodide expressed in equivalents is from 10:1 to 1.1:1, and the ratio of potassium to manganese expressed in equivalents is 2:1 to 5:1 to form the desired butene glycol tetra-acetate.

16. A proces for preparing phenyl glycol diacetate which comprises in combination, in the liquid phase, (a) intimately contacting, oxygen, potassium iodide and manganese acetate, in acetic acid at a temperature of 120–190° C. to form an iodine mixture; and (b) intimately contacting said iodine mixture with styrene at a temperature of 120–190° C.; wherein the ratio of total metal to iodide expressed in equivalents is from 10:1 to 1.1:1 and the ratio of potassium to manganese expressed in equivalents is 2:1 to 5:1 to form the desired glycol diacetate.

17. A process for preparing glycerol tri-acetate which comprises in combination, in the liquid phase, (a) intimately contacting oxygen, potassium iodide and manganese acetate, in acetic acid at a temperature of 120–190° C. to form an iodine mixture; and (b) intimately contacting said iodine mixture with allyl alcohol at a temperature of 120–190° C.; wherein the ratio of total metal to iodide expressed in equivalents is from 10:1 to 1.1:1 and the ratio of potassium to manganese expressed in equivalents is 2:1 to 5:1, to form the desired glycerol triacetate.

(References on following page)

References Cited

UNITED STATES PATENTS

| | | | |
|---|---|---|---|
| 3,689,535 | 9/1972 | Kollar | 260—497 R |
| 1,999,621 | 4/1935 | Van Peski | 260—497 |
| 2,701,813 | 2/1955 | Snyder | 260—497 |

FOREIGN PATENTS

| | | | |
|---|---|---|---|
| 500,020 | 2/1954 | Canada | 260—497 |

LORRAINE A. WEINBERGER, Primary Examiner

R. D. KELLY, Assistant Examiner

U.S. Cl. X.R.

260—287, 295.5, 347.5, 326.13 A, 332.2 A, 465 D, 465.3, 468 R, 469, 471 R, 473 G, 473 S, 474, 475 N, 476 R, 481 R, 483, 484 R, 485 G, 487, 488 J, 491, 410.6

UNITED STATES PATENT OFFICE
CERTIFICATE OF CORRECTION

Patent No. 3,770,813          Dated November 6, 1973

Inventor(s) John Kollar

It is certified that error appears in the above-identified patent and that said Letters Patent are hereby corrected as shown below:

In the table at Col. 2, in Run 5, ".0026 Fe $(OAc)_2ON$" should read -- .0026 Fe $(OAc)_2OH$ --.

In the table at Col. 2, in Run 6, ".00106 Fe $(OAc)_2ON$" should read -- .00106 Fe $(OAc)_2OH$ --.

In the table at Col. 2, in Run 7, ".00082 Mn $(OAc_2\ 4N_2O$" should read -- .00082 Mn $(OAc)_2\ 4H_2O$ --.

In the table at Col. 2, in Run 8, ".00082 Mn$(OAc)_2^.\ 4H_2O$" should read -- .00082 Mn $(OAc)_2\ 4H_2O$ --.

In the table at Col. 2, insert Run 9

| | Moles $I_2$ | Moles KI | Moles, Metal Ac | gm HAC | % Ethylene Diacetate | % Selectivity |
|---|---|---|---|---|---|---|
| 9 | - | - | .00106 Fe$(OAc)_2OH$ | 10 | 0.0 | |

In the table at Col. 2, in Run 10, "31.2" should read -- 13.2 --.

Col. 3, line 14, "reached" should read -- reacted --.

Col. 3, line 40, "methybutene-2" should read -- methylbutene-2 --.

UNITED STATES PATENT OFFICE
CERTIFICATE OF CORRECTION

Page 2

Patent No. 3,770,813            Dated November 6, 1973

Inventor(s) John Kollar

It is certified that error appears in the above-identified patent and that said Letters Patent are hereby corrected as shown below:

Col. 3, line 45, should read -- Accordingly, olefins which may be suitably employed and are within the contemplation of this invention are alkenes, ar-alkenes and cycloalkenes. --.

Col. 4, line 23, "choride" should read -- chloride --.

Col. 4, line 24, "cycohexene" should read -- cyclohexene --.

Col. 4, line 65, "1-naphthaleneactic" should read -- 1-naphthaleneacetic --.

Col. 5, line 40, "sale" should read -- salt --.

Col. 7, line 33, "100 p.s.i.a." should read -- 100 p.s.i.g. --

Col. 7, line 67, "75 p.s.i.g." should read -- 75 p.s.i.a. --.

Col. 8, line 18, "400 g." should read -- 480 g. --.

Col. 8, line 22, "97 M." should read -- 97M% --.

Col. 9, line 31, "picoltoic" should read -- picolioic --.

Col. 11, line 49, "iodine" should read -- iodide --.

Col. 12, line 6, "iodine" should read -- iodide --.

Col. 12, line 19, "iodine" should read -- iodide --.

Signed and sealed this 18th day of June 1974.

(SEAL)
Attest:

EDWARD M. FLETCHER, JR.
Attesting Officer

C. MARSHALL DANN
Commissioner of Patents